United States Patent [19]
Arai

[11] Patent Number: 5,480,235
[45] Date of Patent: Jan. 2, 1996

[54] BEARING SEALING DEVICE

[75] Inventor: Junichi Arai, Okayama, Japan

[73] Assignee: Uchiyama Manufacturing Corp., Okayama, Japan

[21] Appl. No.: 284,215

[22] Filed: Aug. 2, 1994

[51] Int. Cl.$^6$ ................................................. F16C 33/76
[52] U.S. Cl. ........................................ 384/484; 277/188 A
[58] Field of Search ............................. 384/477, 484, 384/486, 488; 277/188 A, 166

[56] References Cited

U.S. PATENT DOCUMENTS

| | | | |
|---|---|---|---|
| 3,226,168 | 12/1965 | Rechnagel | 384/484 |
| 3,806,212 | 4/1974 | Piva | 384/484 |
| 5,133,609 | 7/1992 | Ishiguro | 384/486 |

FOREIGN PATENT DOCUMENTS

| | | | |
|---|---|---|---|
| 54-68882 | 6/1979 | Japan . | |
| 132045 | 10/1979 | Japan | 384/484 |

*Primary Examiner*—Thomas R. Hannon
*Attorney, Agent, or Firm*—Wenderoth, Lind & Ponack

[57] ABSTRACT

A bearing sealing device is used for sealing a bearing assembly by inserting the sealing device through an insertion hole in the bearing assembly and mounting it in a fitting groove formed therein. Individual bearing sealing devices may be obtained by punching operations, and may be produced in large quantities and continuously without requiring any subsequent treatment such as removal of burrs. The bearing sealing device thus formed provides improved firm fitting to the bearing assembly. The bearing sealing device includes an elastic sealing ring and a backing ring combined with each other. The elastic sealing ring has a sealing lip around the peripheral edge thereof extending beyond the corresponding peripheral edge of the backing ring. With the bearing sealing device mounted on the bearing assembly, part of the lip is formed to include a swelling that extends outwardly of the fitting groove so as to embrace the peripheral edge of the backing ring, thus holdiong the backing ring firmly.

4 Claims, 4 Drawing Sheets

BEARING SEALING DEVICE

BACKGROUND OF THE INVENTION

1. Field of the Invention

The present invention relates to a bearing sealing device, and more particularly to a sealing device for bearing assembly that is designed for massive continuous production without requiring any subsequent treatment and provides an improved firmness to the bearing when it is mounted on the bearing assembly.

2. Description of the Prior Art

A conventional bearing sealing device that is mounted on a bearing assembly having an outer ring and an inner ring rotating relative to each other includes a backing ring and a sealing material molded to have a sealing lip. Typically, the bearing sealing device is obtained by vulcanizing any elastic sealing material and molding it together with the backing ring to the appropriate shape. Then, the bearing sealing device is mounted on the bearing assembly by inserting a fixing part of the bearing sealing device into a fitting groove in the bearing assembly by sliding. In most cases, to permit an easy insertion and mounting, the fixing part is usually molded in soft form without the backing ring.

When such bearing devices are molded, however, the molding process involves the steps of placing a backing ring in a metal mold correctly, adding a sealing material to the metal mold, molding them together into a shape, and removing the molded shape from the metal mold. Those steps are usually complicated. When the sealing material is molded, burrs are always produced from any excess material. Thus, the molded shape always contains such burrs when it is removed from the metal mold. Such burrs then must be removed. This additional step or subsequent treatment is also tedious.

One proposed solution addresses the above problem. In this solution, a punch is used to obtain a bearing sealing device. This method and the bearing seal obtained by this method are described in Japanese unexamined patent publication No. 54-68882. Briefly, the method is described below and illustrated in FIGS. 7 and 8. A backing plate a forming a backing ring 2' is combined with a sealing material b forming a sealing ring 3'. Then, the backing plate a and sealing material b are placed in a metal mold 11 where they are firmly held together, and are punched to a bearing seal shape by using a punch 4. This punching is performed by moving the punch 4 across the backing plate a and sealing material b from the side of the sealing material b toward the backing plate a, as shown by an arrow 12 in FIG. 8. As the punch 4 is moving downwardly as shown by the arrow 12, it presses the upper side portion of the sealing material b and causes it to move peripherally as shown by an arrow 13, and the punching is then performed with the upper side portion of the sealing material h extended toward its periphery. The upper side portion of the backing plate a and the lower side portion of the sealing material b engage each other so closely that they cannot be moved relative to each other. When the punching is completed, the sealing material b includes a sealing lip 10 (as shown in FIG. 7) which is formed by the upper peripheral side portion of the sealing material b and extends beyond the punched peripheral edge of backing ring 2'. As shown in the above publication No. 54-68882, the bearing sealing device B obtained in the above method includes the backing ring 2' and sealing ring 3' formed by punching the resepective backing plate and sealing material together.

To permit an easy insertion and mounting, the bearing sealing device B is, in most cases, mounted to bearing assembly 1 by inserting it with the backing ring 2' facing inside and the sealing ring 3' facing outside, as shown in FIG. 7. When it is inserted in this way, the sealing ring 3' tends to be pulled by the backing ring 2' which prevents the sealing ring 3' from being seated in a fitting groove 6. In some cases, either of the backing ring 2' and sealing ring 3' may be detached wholly or partially from the other, or may be reversed. Thus, the sealing ring 3' cannot be seated firmly. The bearing sealing device B may easily slip out of the fitting groove 6 if vibrations or sways should occur on the bearing assembly. As the bearing sealing device B is not firmly secured to the bearing assembly, there is the risk that the bearing sealing device B may rotate with inner race or ring 1' in the bearing assembly.

SUMMARY OF THE INVENTION

In light of the problems of the prior art sealing device as described above, a principal object of the present invention is to provide a bearing sealing device that is designed for massive continuous production without requiring any subsequent treatment such as removal of burrs that would otherwise occur and to provide a good firmness to the bearing assembly when the bearing sealing device is mounted therewith.

In one aspect, the present invention concerns a bearing sealing device A designed to seal the bearing assembly by inserting it through an insertion hole or opening 9 between outer ring 1 and inner ring 1' rotating relative to each other and then fitting it into an annular fitting groove 6 formed along the inner wall of the outer ring 1. The sealing device A includes a backing ring 2 to be formed from a backing plate a of metal or synthetic resin and a sealing ring 3 to be formed from an elastic sealing material b. The backing plate a and sealing material b are combined together, and are then punched by using a punch 4 so that the sealing ring 3 can be formed to include a sealing lip 5 extending beyond the peripheral punched edge of the backing ring 2. When the punching occurs, it is important that the backing ring 2 should have a specific outer diameter d in relation to inner diameter c of the inner peripheral wall of the insertion hole 9 in the outer ring 1, and that the sealing lip 5 should have a specific fitting volume v in relation to the volume V of the fitting groove 6 (FIG. 3).

Specifically, the relationship between the outer diameter d of the backing ring 2 and the inner peripheral diameter c of the insertion hole 9 in the outer ring 1 may be chosen such that the gap g that is created between the outer peripheral edge of the backing ring 2 and the inner peripheral wall of the insertion hole 9 when the sealing device A is inserted through the insertion hole 9 is equal to between 10% and 30% of the specific thickness f of the sealing ring 3. Specific respective values for the outer diameter d, inner diameter c, thickness f and gap g are illustrated in FIGS. 1, 2 and 4.

The specific relationship between the fitting volume v for the sealing lip 5 and the volume V for the fitting groove 6 may be chosen such that the former is greater than the latter. In this way, the sealing device A can be inserted into the bearing assembly with the sealing ring 3 facing the fitting groove 6, and when the sealing ring 3 is mounted in the fitting groove 6, 10% to 40% of the fitting volume v of the sealing lip 5 can form a swelling 8 from the lip 5 and its peripheral margin that extends toward the outside of the groove 6 and embraces the peripheral edge of the backing ring 2 firmly. The volume v for the sealing lip 5 and the volume V for the groove 6 should be understood to mean the volumes for the portions shown in FIG. 3, respectively.

According to an aspect of the present invention, the bearing sealing device includes the backing ring 2 and the sealing ring 3 having the lip 5 which are formed together by punching, wherein the backing ring 2 and the sealing ring 3 with the lip 5 have the respective dimensions and shapes that can satisfy the relationships as defined above between the inner diameter c for the insertion hole 9 in the outer ring 1 and the volume V for the fitting groove 6.

In another aspect, the present invention provides a variation of the bearing sealing device A as shown in FIG. 6. As shown in FIG. 6, the bearing sealing device A includes the backing ring 2 and the sealing ring 3 having the lip 5 formed as above on the side of the groove 6 in the outer ring 1. The sealing ring 3 further includes a seal 7 molded to the shape as shown on the side of the inner ring 1'.

As the above relationship exists between the inner diameter c for the insertion hole 9 in the outer ring 1 and the outer diameter d for the backing ring 2, the backing ring 2 can be inserted without any mechanical resistance when the sealing device A is inserted through the insertion hole 9 with the sealing ring 3 facing the groove 6. The sealing lip 5, which has an outer diameter d greater than the outer diameter d of the backing ring 2 and the inner diameter c of the insertion hole 9 in the outer ring 1, is retained in the insertion hole 9. When the sealing device A is fitted in the groove 6 with the sealing ring 3 facing the groove 6, 10% to 40% of the fitting volume v of the lip 5 can form a swelling 8, i.e. a portion of increased size as shown in FIG. 4, from the lip 5 and its peripheral edge that extends outwardly of the groove 6, and embraces the peripheral edge of the outer surface of the backing ring 2. The sealing device A can thus be seated firmly in the bearing assembly.

The relationship that is defined specifically for the sealing device A according to the present invention is now described in further detail. In the following description, the ratio of the "gap g" to the "thickness f of the sealing ring 3", or g/f×100, may be expressed in terms of the gap ratio R (%), and the ratio of the "volume U of the portion of the lip 5 forming the swelling 8 extending toward the outside of the groove 6" to the "fitting volume v of the lip 5", or U/v×100, may be expressed in terms of the volume ratio P (%).

In other words, the relationship as defined according to the present invention is such that the gap ratio R has any value ranging between 10% and 30%, and the volume ratio P has any value ranging between 10% and 40%.

The gap ratio R and volume ratio P have great bearing upon the fitting load required for mounting the sealing device A between the outer and inner rings 1, 1' rotating relative to each other and to a slipping load required for letting the sealing device A slip or drop out of the groove 6 in the outer ring 1.

This relationship is represented graphically in FIG. 5 which has been drawn by plotting the results of the experiments conducted by the inventor. It may be seen from FIG. 5 that the gap ratio R and the volume ratio P have an inverse proportional relationship. That is, the volume ratio P becomes smaller inversely as the gap ratio R becomes greater. On the contrary, the fitting load and the slipping load have the relationship such that as the fitting load becomes greater, the slipping load becomes greater while as the fitting load becomes smaller, the slipping load becomes smaller. To help understand those relationships, the load is shown along the ordinate (Y) axis and the gap ratio R and volume ratio P are shown along the abscissa (X) axis in FIG. 5.

As is clear from FIG. 5, the fitting load will become greater than required if the gap ratio R falls below 10%. If this is the case, the swelling 8 would be broken, and therefore might not be created. Conversely, if the gap ratio R rises above 30%, the slipping load would become too small, causing the sealing device A to slip out of the groove 6 more easily. If the volume ratio P falls below 10%, then it is more likely that the slipping load would become smaller, causing the sealing device A to rotate together with the inner ring 1' in the bearing assembly. In this case the swelling 8 might not be created. If the volume ratio P rises above 40%, the fitting load would become greater than required. Depending upon the physical dimensions of the particular bearing assembly, in this case, the swelling 8 might be created beyond the end of the insertion hole 9 in the outer ring 1 in the bearing assembly.

It may he appreciated from the foregoing description that the bearing sealing device A according to the present invention may be obtained by punching its component-parts to the appropriate shape. Advantageously, the punching process does not involve the steps of placing the backing ring correctly within the metal mold, adding the sealing materials to the metal mold, molding them to the appropriate shape, and removing the molded shape from the metal mold, which steps are performed for the conventional bearing sealing device. Furthermore, there is no need of removing any burrs that may occur following such steps. According to the present invention, individual sealing devices can be obtained very easily, continuously and in large numbers.

It may also be appreciated from the preceding description that the bearing sealing device A according to the present invention includes the lip 5 which has the volume relationship with the fitting groove 6 such that the volume v of the sealing lip 5 is greater than the volume V of the groove 6, whereby 10% to 40% of volume v of sealing lip 5 can be employed to form swelling 8 extending from sealing lip 5 and its peripheral margin toward the exterior of the groove 6 for embracing the peripheral edge of the outer surface of backing ring 2 firmly, by the friction that is produced against the inner peripheral wall of the insertion hole 9 when the sealing device A is inserted through insertion hole 9 into the groove 6 with the sealing ring 3 facing groove 6 and mounted in groove 6. This increases the firmness of mounting of the sealing device to the bearing assembly. Thus, the sealing device can provide enhanced sealing ability. The sealing device can engage the bearing assembly with increased firmness, and can be seated more securely and stably in the bearing assembly. Thus, there is no risk that the sealing device A might rotate with the inner ring 1' of the bearing assembly. Furthermore, there is no risk that the sealing device A might slip or drop out of its fitting groove 6 under any vibrations or sways that may be imparted to the bearing assembly.

All individual bearing sealing devices A obtained as above according to the present invention can be mounted on all corresponding bearing assemblies without losses due to improper mounting.

The bearing sealing device A can be mounted in the bearing assembly with the sealing ring 3 facing toward its fitting groove 6 in the outer ring 1 of the bearing assembly. In this way, either of the sealing ring 3 and backing ring 2 can be prevented from being detached partly or wholly from the other or being reversed. Rather, the sealing ring 3 and backing ring 2 are pressed against each other within the fitting groove 6 and engage each other more firmly.

The bearing sealing device A according to the present invention includes the backing ring 2 and the sealing ring 3 with the lip 5 having the specific dimensions and shapes defined above in relation to the inner diameter c of the insertion hole 9 in the outer ring 1 of the bearing assembly including the outer and inner rings 1, 1' rotating relative to each other and the volume V of the fitting groove 6. All sealing devices A can be obtained simply by punching. In accordance with the present invention, the punching process may be performed by following the steps as described in the earlier mentioned prior art (Japanese unexamined patent publication No. 54-68882) and described above.

BRIEF DESCRIPTION OF THE DRAWINGS

The above and other objects, merits, and features of the present invention may be readily understood from the following detailed description of several preferred embodiments which are shown in the accompanying drawings by way of example, in which.

DESCRIPTION OF PREFERRED EMBODIMENTS (Embodiment 1)

Figure 1:
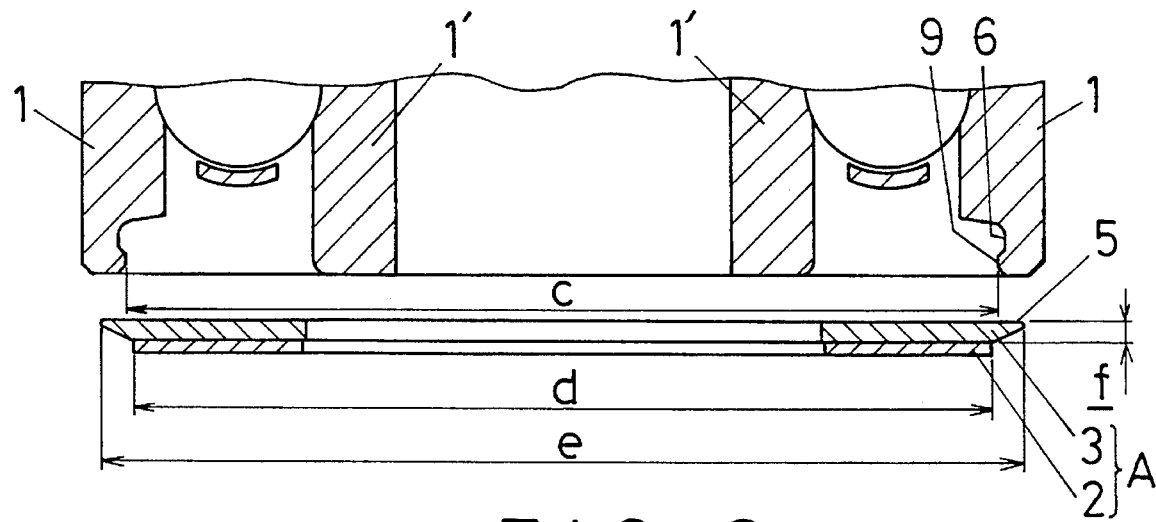
FIG. 1 is a sectional view of a bearing sealing device according to a first preferred embodiment of the present invention, and illustrates how the sealing device is related to a bearing assembly to which it is to be mounted.
Figure 8:
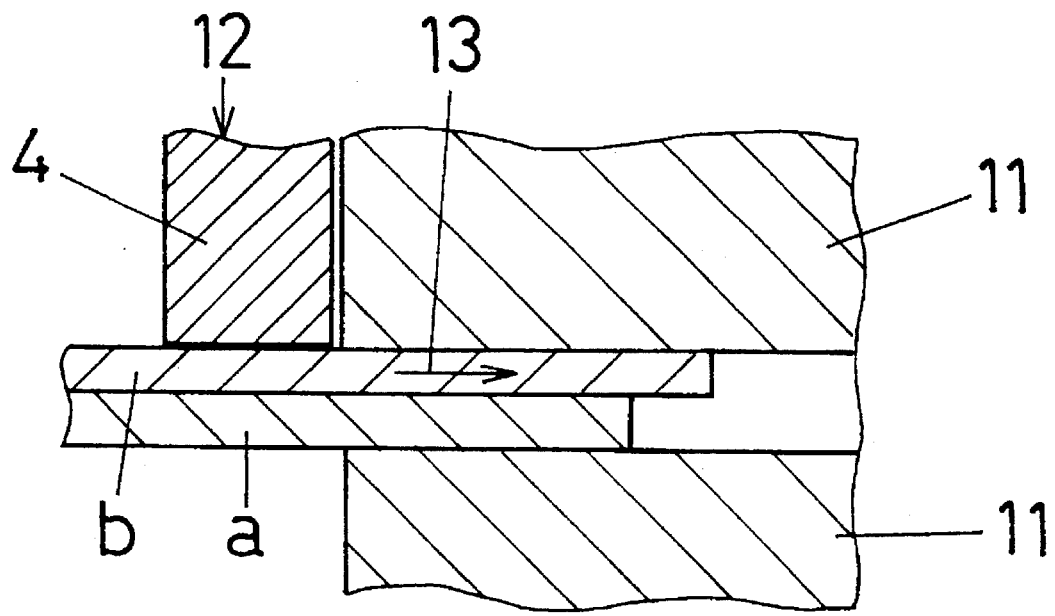
FIG. 8 is a sectional view of the known sealing device according to the prior art, on an enlarged scale, and shows how it may be obtained.

Referring now again to FIGS. 1 through 4, the first preferred embodiment of the present invention is described further. As shown in FIG. 1, the sealing device A according to the present invention may be mounted on a bearing assembly including an outer ring 1 and an inner ring 1' rotating relative to each other, by inserting it through insertion hole 9 formed between the outer and inner rings 1, 1' and then fitting it into annular fitting groove 6 formed on the inner wall of the outer ring 1. In the sealing device A, a backing ring 2 is formed from a backing plate a, and a sealing ring 3 is formed from a sealing material b and is combined with the backing ring 2 by securing it to one side of the backing ring 2 (FIG. 8). The backing plate a and the sealing material b which are combined together are punched by using a punch 4 so that the resulting shape includes the sealing ring 3 having a lip 5 formed around the peripheral edge, thereof so as to extend beyond the peripheral edge of the backing ring 2. The backing plate a may be made of a thin plate or strip of any suitable metal or synthetic resin, and the sealing material b may be made of any elastic material such as synthetic rubber.

This punching process may be performed by placing a sealing material b forming the sealing ring 3 onto a backing plate a forming the backing ring 2 and then combining them together, placing the resulting combination in a holding metal mold where it is fixed in position, and forming it into the bearing seal shape by moving the punch 4 down from the side of the sealing material b toward the backing plate a below it. During the punching process, the upper side portion of the sealing material b may be forced out peripherally by moving the punch 4 downwardly, and then punching may be performed by the punch 4 with the upper side portion of the sealing material b extended toward its periphery. When this occurs, the upper side portion of the backing plate a engages the lower side portion of the sealing material b so closely that the two elements can not move relative to each other. Thus, when the punching operation is completed, the upper side portion of the sealing material b around the peripheral edge thereof can be formed to include lip 5 that extends beyond the peripheral surface formed by the punching operation.

Figure 2:
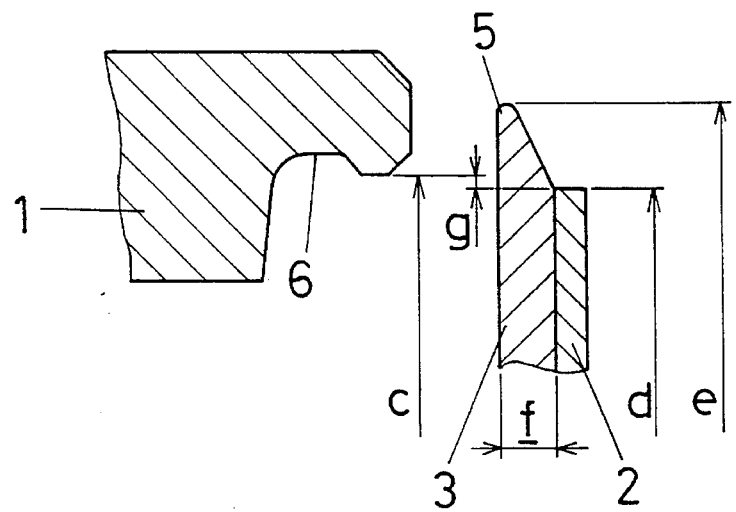
FIG. 2 is a partial sectional view, on an enlarged scale, of the sealing device of the first embodiment, and shows how it is related to the bearing assembly.
Figure 3:
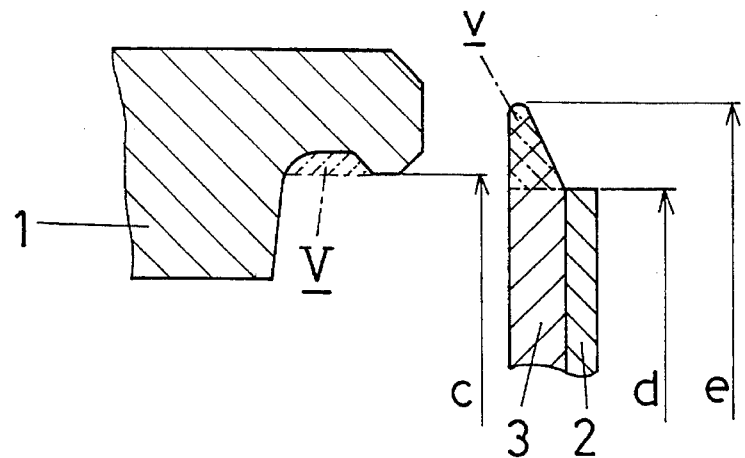
FIG. 3 is a similar sectional view of the sealing device of the first embodiment, and shows relationships to the bearing assembly in terms of volumes.

As shown in FIGS. 1 and 2, the relationship between the outer peripheral diameter d of the backing ring 2 and the inner peripheral diameter c of the insertion hole 9 in the bearing outer ring 1 may be set such that the gap g that is created between the outer peripheral edge of the backing ring 2 and the inner peripheral wall of the insertion hole 9 when the sealing device A is inserted through the insertion hole 9 can have a size equal to 10% to 30% of the thickness f of the sealing ring 3. In this case, the lip 5 has its outer peripheral diameter d greater than the above outer peripheral diameter d and the inner peripheral diameter c. The fitting volume v of the lip 5 and the volume V of the fitting groove 6 have the relationship such that the fitting volume v is greater than the volume V. In this way, 10% to 40% of the fitting volume v of the lip 5 is formed to include a swelling 8 that extends from the lip 5 and its peripheral edge outwardly of the fitting groove 6 by the frictional action of the sealing ring 3 with the inner peripheral wall of the insertion hole 9 in the bearing outer ring 1, when the bearing sealing device A is inserted through the insertion hole 9 with the sealing ring 3 facing the fitting groove 6. The swelling 8 can embrace the peripheral edge of the outer surface of backing ring 2 firmly.

Figure 4:
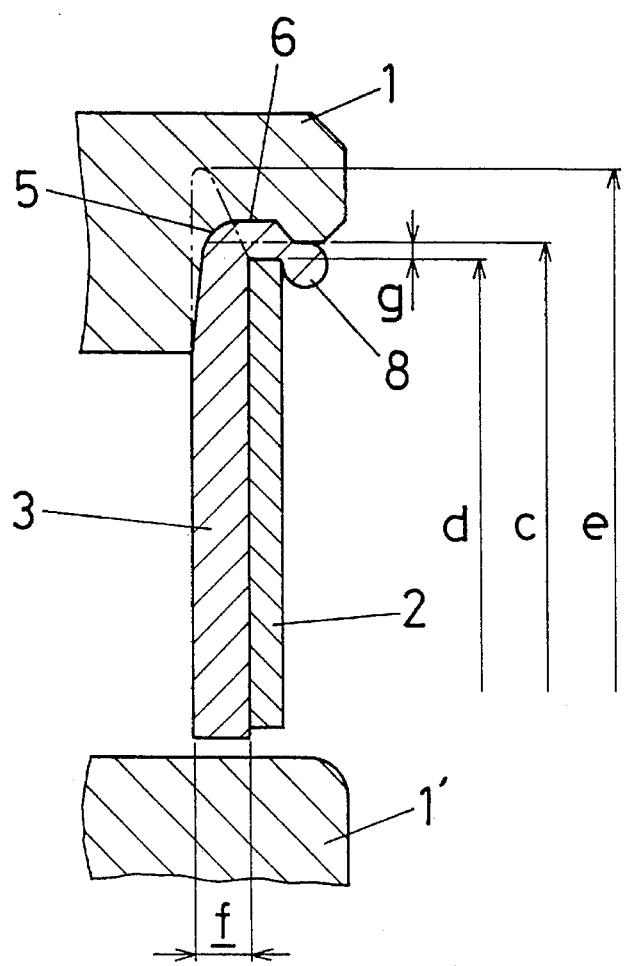
FIG. 4 is a partial sectional view, on an enlarged scale, of the sealing device in the first embodiment, and shows how it is mounted on the bearing assembly.
Figure 5:
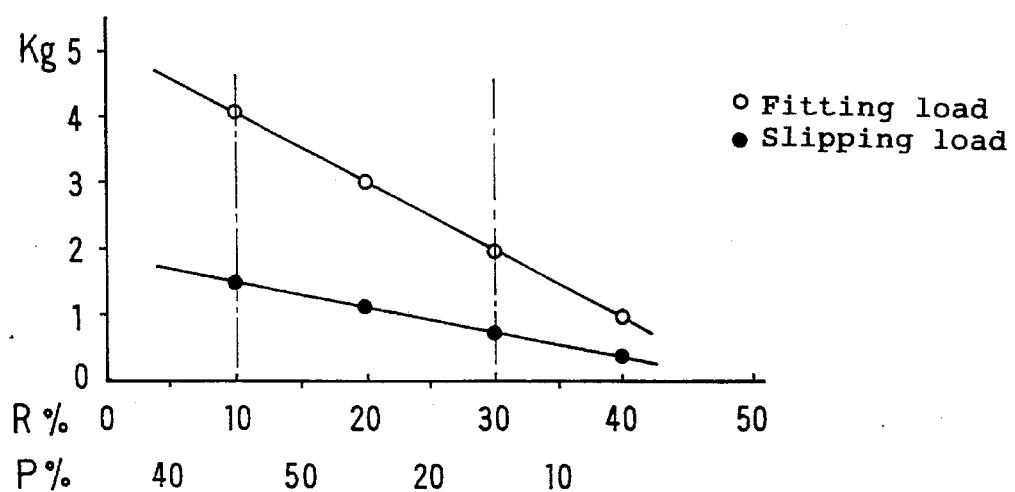
FIG. 5 is a diagram depicting the respective relationships between loads and a gap ratio and a volume ratio.

It may be seen from FIG. 4 that when the bearing sealing device A is inserted with the sealing ring 3 facing the fitting groove 6, the backing ring 2 can pass through the insertion hole 9 without any mechanical resistance, because of the relationship defined above between the inner peripheral diameter c of the insertion hole 9 and the outer diameter d of the backing ring 2. But, backing ring 2 is caught by the insertion hole 9 because the outer peripheral diameter e of the lip 5 is greater than the outer peripheral diameter d of the backing ring 2 and the inner peripheral diameter c of the insertion hole 9. Then, when the sealing device A is mounted in the fitting groove 6 after it is inserted with the sealing ring 3 facing the fitting groove 6, 10% to 40% of the fitting volume v of the lip 5 is formed to include the swelling 8 that extends from the lip 5 and its peripheral edge outwardly of the fitting groove 6 by the frictional action of the sealing ring 3 with the inner peripheral wall of the insertion hole 9. The swelling 8 embraces the peripheral edge of the outer side of the backing ring 2, thus holding backing ring 2 firmly.

FIG. 4 shows the sealing device A mounted in the bearing assembly. In this embodiment, the sealing device is designed to have the dimensional relationships as specified below. Specifically, the backing ring 2 has the outer peripheral diameter d of 11.9 mm, the insertion hole 9 has the inner wall diameter c of 12 mm, and the sealing ring 3 has the thickness f of 0.2 mm. That is to say, the gap ratio R is 25%. The fitting volume v is given as =100, the volume V of the fitting groove 6 is equal to 14, and the volume U of the portion of the lip 5 that includes the swelling 8 formed to extend outwardly of the fitting groove 6 is equal to 15. Thus, the volume ratio P is equal to 15%.

It may be seen from FIG. 4 that the bearing sealing device according to the present invention is designed to make no contact with the sliding element, or the inner ring 1', in the bearing assembly.

In the first preferred embodiment shown in FIGS. 1 through 4, the side of the bearing sealing device A that is rotating and sealing, that is the inner peripheral side, is formed to be a simple shape. This shape may be obtained by punching both the inner and outer peripheries of the backing plate a and sealing material b. This shape is very useful for a bearing sealing device which is used for sealing very small areas in a miniature bearing, for example.

When the backing plate a made of any thin metal plate or strip is punched by the punch 4, the formed backing ring 2 can be protected against any deposited moisture or water by applying any anticorrosive treatment to the areas in section or to surface areas. The anticorrosive treatment may be omitted when the backing plate is made of stainless steel or synthetic resins. When a backing plate of any synthetic resin is used, any inorganic fibers may be added to the synthetic resin to provide enhanced mechanical strength or rigidity.

In the current embodiment, the bearing sealing device A is designed such that its outer diameter side has the fitting part or lip 5 that engages fitting groove 6 in the outer ring 1 on the bearing assembly. The present invention is not limited to this embodiment, which may be varied such that the inner diameter side can engage the fitting groove which is provided at the inner diameter side.

(Embodiment 2)

Figure 6:
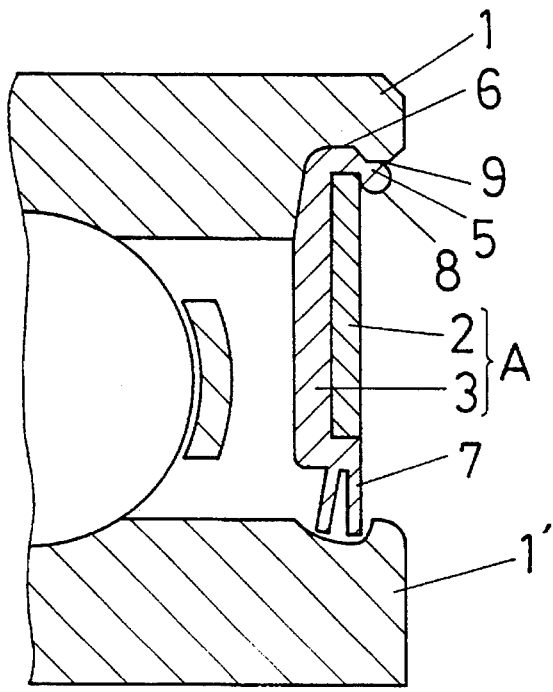
FIG. 6 is a sectional view of a sealing device according to another preferred embodiment, and shows how it is mounted on the bearing assembly.
Figure 7:
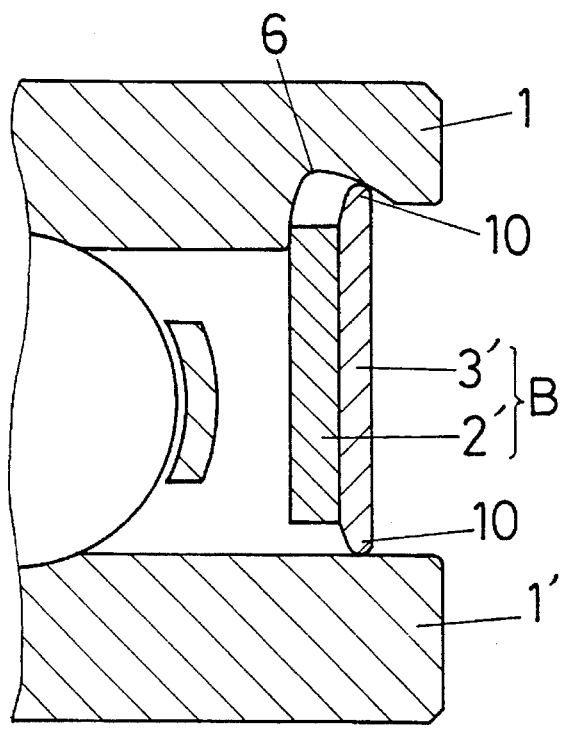
FIG. 7 is a sectional view of a typical sealing device according to the prior art and shows how it is mounted on a bearing assembly.

The bearing sealing device A shown in FIG. 6 may be used when higher sealing requirements must be met for the bearing assembly. In this embodiment, the bearing sealing device A includes a molded seal 7 that has a complex configuration that conforms to the shape of the bearing element located on the rotating and sealing side. The bearing sealing device which has the rotating and sealing side having the shape shown in FIG. 6 can provide a greater sealing function.

When the sealing device A is formed to the shape shown in FIG. 6, the preferred way is firstly to form a seal 7 to the desired shape by molding, and then to punch the fitting side including the lip 5. The punching process may be performed by following the steps described in connection with the first embodiment. To avoid duplication, such steps are not described here. The steps of inserting the sealing device A through the insertion hole 9 in the outer and inner rings 1, 1' and mounting it in the fitting groove 6 may be performed in a manner similar to that described in the preceding embodiment. Thus, this description is not provided here.

Although the present invention has been described in connection with the particular preferred embodiments, it should be understood that various changes and modifications may be made without departing from the spirit and scope of the invention as defined in the appended claims.

What is claimed is:

1. In a bearing assembly including an inner ring with an outer wall and an outer ring with an inner wall, one of said walls having therein a fitting groove, said rings being rotatable relative to each other with said walls facing each other and with an insertion opening between said rings, said insertion opening being defined by a peripheral edge of said one wall opening into said groove, and a sealing device inserted through said insertion opening and fitting in said groove to seal said assembly, the improvement comprising:

said sealing device comprising a sealing ring and a backing ring combined together, said sealing ring being formed of an elastic sealing material and said backing ring being formed of metal or a synthetic resin material, said sealing ring having a peripheral sealing lip extending radially beyond a corresponding adjacent peripheral edge of said backing ring;

said sealing device being fitted into said groove with said sealing ring facing inwardly and said sealing lip fitted into said groove;

said peripheral edge of said backing ring and said peripheral edge of said one wall defining said insertion opening having respective diameters such that a gap formed therebetween with said sealing device fitted in said groove is equal to between 10% and 30% of the thickness of said sealing ring; and said sealing lip having a volume sufficiently greater than the volume of said groove such that when said sealing device is fitted in said groove, from 10% to 40% of said volume of said sealing lip is caused to form a swelled portion extending from said sealing lip toward the exterior of said groove and embracing a peripheral edge of a surface of said backing ring that is directed away from said sealing ring, as a result of friction produced between said sealing lip and said peripheral edge of said one wall when said sealing device is inserted through said insertion opening.

2. The improvement claimed in claim 1, wherein said groove is formed in said inner wall of said outer ring, and said sealing ring extends peripherally outwardly beyond the outer peripheral edge of said backing ring.

3. The improvement claimed in claim 2, wherein said sealing ring has formed at an inner periphery thereof a molded seal sealing with said inner ring.

4. The improvement claimed in claim 1, wherein said sealing ring has, at a periphery thereof opposite said sealing lip, a molded seal sealing with said inner or outer ring without said groove.

* * * * *